Sept. 25, 1928.
T. R. DUNCAN
1,685,694
COMBINED WEIGHING AND DUMPING BODY FOR MOTOR TRUCKS
Filed Nov. 22, 1927  2 Sheets-Sheet 1
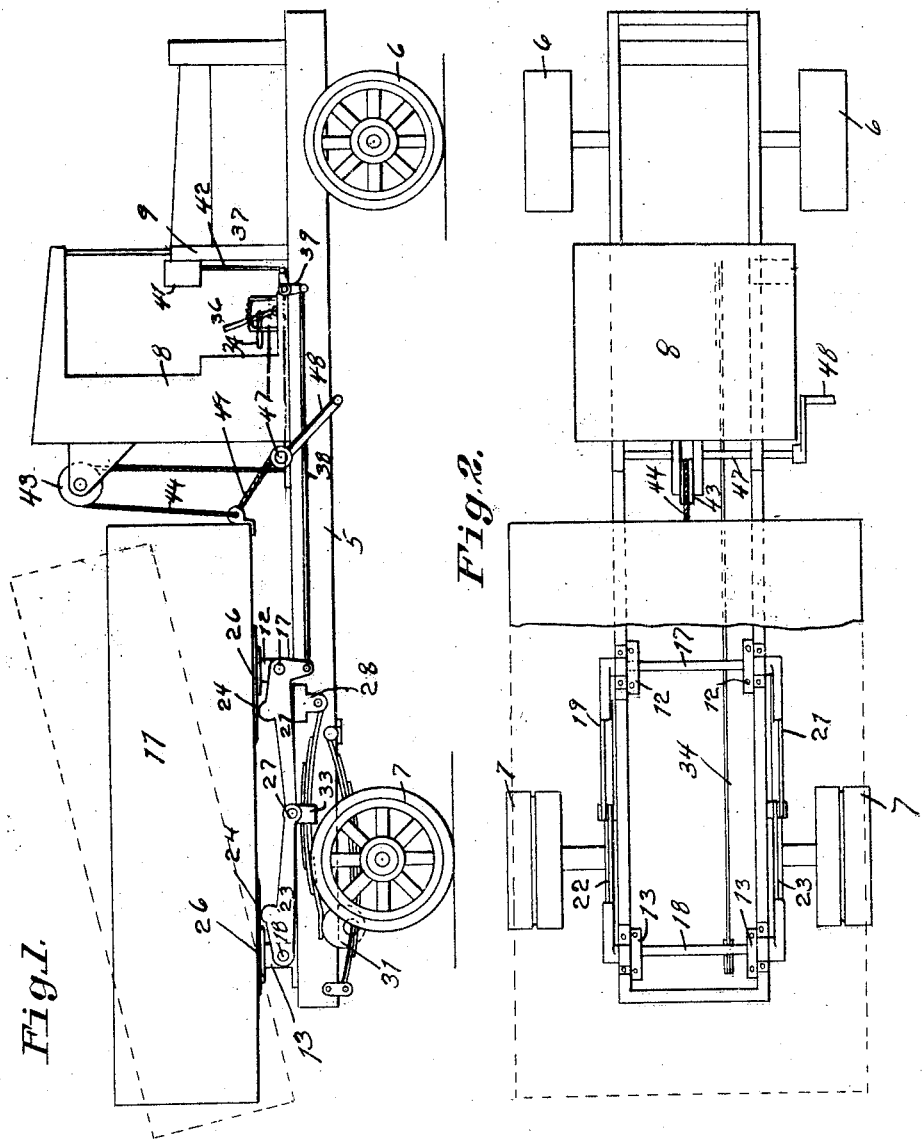
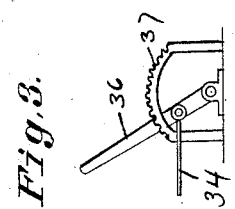
INVENTOR.
T. R. Duncan
BY Victor J. Evans
ATTORNEYS.

Sept. 25, 1928. 1,685,694
T. R. DUNCAN
COMBINED WEIGHING AND DUMPING BODY FOR MOTOR TRUCKS
Filed Nov. 22, 1927 2 Sheets-Sheet 2
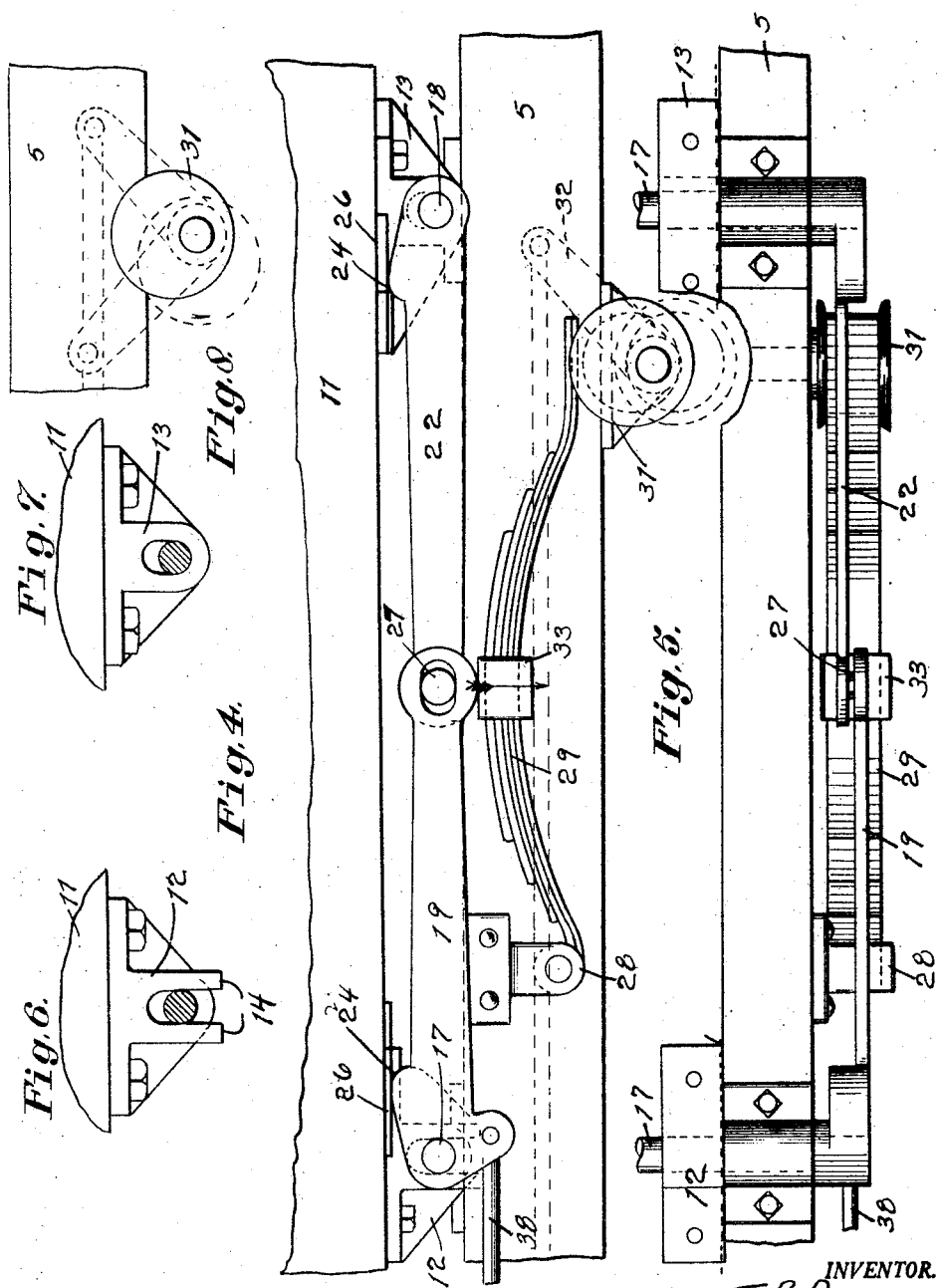
INVENTOR.
T. R. Duncan
BY Victor J. Evans
ATTORNEYS.

Patented Sept. 25, 1928.

1,685,694

UNITED STATES PATENT OFFICE.

THOMAS R. DUNCAN, OF RICHMOND, CALIFORNIA.

COMBINED WEIGHING AND DUMPING BODY FOR MOTOR TRUCKS.

Application filed November 22, 1927. Serial No. 235,054.

This invention relates to improvements in combined weighing and dumping bodies for motor trucks.

The principal object of this invention is to provide means for weighing a load placed in the body of a motor truck, without placing the entire truck upon a platform scale Another object of the present invention is to provide means whereby the weighing mechanism may be thrown out of operation when desired.

Another object is to provide means whereby the weighing mechanism may be indicated at a point adjacent the driver.

A further object is to provide means whereby the customary dumping action usually found upon trucks may be also used if desired, without interfering with the weighing mechanism.

Other objects and advantages will be apparent during the course of the following description.

In the accompanying drawings forming a part of this specification and in which like numerals are employed to designate like parts throughout the same, Figure 1 is a side elevation of a motor truck constructed in accordance with my invention, Figure 2 is a top plan view of Figure 1, showing a portion of the body broken away, Figure 3 is a fragmentary detail view showing a ratchet lever for throwing the weighing mechanism into or out of operating position, Figure 4 is an enlarged detail view showing the manner of mounting the truck body upon the chassis and the associated mechanism for weighing the load within the body, Figure 5 is a top plan view of Figure 4, Figure 6 is a fragmentary detail view showing one of the body lugs.

Figure 7 is a view similar to Figure 6, showing another form of body lug, and

Figure 8 is a fragmentary detail view showing the cam employed for raising and lowering the weighing spring.

At the present time, it is customary to load a truck either by hand or by power, such as a steam shovel, and then drive away to the point of dumping. Many States require that a truck shall not carry over a pre-determined load and due to the different specific gravities of different materials, it is difficult to estimate the weight of a load. For instance, a load of brick will weight less than a load of wet sand. It is therefore essential that some means be provided for indicating to the operator of the vehicle when a sufficient load has been placed upon the motor truck, in order to not transgress the laws governing the roads over which the vehicle is to travel.

In order to accomplish this object, I employ a motor truck or similar vehicle having a chassis frame 5 and the customary wheels 6 and 7. The driver's compartment is shown at 8 and the dash at 9.

This construction is common to all types of motor vehicles and forms no part of my invention.

At 11 I have shown a truck body in which a load is adapted to be placed. Carried upon the underside of the truck body are lugs 12 and 13. The lugs 12 are located near the forward end of the body and have downwardly extending ends 14, while the lugs 13 are placed at the rear end of the body and have downwardly extending slotted portion 16. The lugs 12 overlie a cross bar 17, while the lugs 13 overlie a cross bar 18. These cross bars 17 and 18 are journaled upon the chassis frame 5.

Secured to each end of the cross bar 17 are beam arms 19 and 21, while secured to each end of the cross bar 18 are beam arms 22 and 23. The beam arms are each provided with a nose 24 which contacts bearing plates 26 carried upon the under side of the body 11, the overlapping ends of these beam arms are slidably connected together as by a pin and slot connection as shown at 27 in Figure 4.

A bracket 28 is secured to the frame 5 and serves to support one end of a weighing spring 29. The opposite end of this rests upon an eccentric 30. This eccentric is journaled to the under side of the frame 5 and has a lever 32 connected thereto, which lever is adapted to move the eccentric for the purpose of raising or lowering one end of the spring 29. The spring 29 carries a block 33 which bears upon the under surface of the beam arms as best shown in Figure 4.

The lever 32 is connected by a rod 34 to a lever 36 mounted in the driving compartment of the vehicle. This lever 36 moves over a quadrant 37 and when actuated will raise or lower the weighing spring 29 as will be later described.

A rod 38 is connected to one of the beam arms and has its opposite end connected to a bell crank lever 39. An indicator is shown at 41 and has a rod 42 extending therefrom to the opposite arm of the bell crank lever from that connected to the rod 38. In order to raise and lower the truck body, I provide any convenient means such as illustrated herein, wherein a pulley 43 is secured to the back of the driver's compartment and has a cable 44 reeved thereover, one end being connected as at 46 to the bottom of the body, while the opposite end is wound upon a winding spindle 47 which is rotated by the lever 48.

A cable 49 has one end connected to the body as at 46 and is wound about the spindle 47 in a direction opposite to the cable 46. The result is that as the lever 48 is rotated in one direction, the body may be lifted and when rotated in the opposite direction the body will be lowered.

The operation of my device is as follows:—

When the lever 36 is moved forward the eccentric 31 is actuated so that the spring 29 is elevated. The spring's upward pressure will bear upon the ends of the beam arms with the consequent raising of the same, which will result in the raising of the vehicle body. This raising is permitted through the slots and bifurcated end connections of the body lugs 12 and 13. The vehicle is then loaded with the result that the weight of the load in the vehicle bears upon the noses of the beam arms, tending to press the arms downwardly. When the weight becomes sufficient to overcome the action of the spring 29, movement of the beam arms will be transmitted through the rod 38 to the indicating device 41.

As soon as the required load has been placed upon the body the operator moves the lever 36 so as to throw the eccentric to its lowered position, with the result that the body as a whole is lowered onto the cross bars 17 and 18, which will carry the load during transportation.

It will thus be seen that I have provided a device which will accomplish all of the objects above set forth.

It is to be understood that the form of my invention herewith shown and described is to be taken as a preferred example of the same, and that various changes relative to the size, shape, material and arrangement of parts may be resorted to without departing from the spirit of the invention, or the scope of the subjoined claims.

Having thus described my invention, I claim:—

1. In a device of the character described the combination with a vehicle chassis, a body positioned thereon, a plurality of beam arms mounted on said chassis, each of said arms having a nose adapted to be moved into contact with the bottom of said body, a spring having one end secured to said chassis, means for raising and lowering the opposite end of said spring, said spring being adapted to be contacted by said beam arms, for the purpose specified.

2. In a device of the character described the combination with a vehicle chassis, a body positioned thereon, a plurality of beam arms mounted on said chassis, each of said arms having a nose adapted to be moved into contact with the bottom of said body, a spring having one end secured to said chassis, means for raising and lowering the opposite end of said spring, said spring being adapted to be contacted by said beam arms, said means including an eccentric, a lever adapted to move said eccentric, a rod secured to said lever, and extending to a remote point, means for indicating at a remote point the movement of said beam arms.

In testimony whereof I affix my signature.

THOMAS R. DUNCAN.